United States Patent
Banks, III

(10) Patent No.: US 6,652,414 B1
(45) Date of Patent: Nov. 25, 2003

(54) VEHICLE ENGINE BRAKE AND CONTROL SYSTEM

(76) Inventor: Gale C. Banks, III, 157 Sawpit La., Bradbury, CA (US) 91010

( * ) Notice: Subject to any disclaimer, the term of this patent is extended or adjusted under 35 U.S.C. 154(b) by 0 days.

(21) Appl. No.: 09/995,264

(22) Filed: Nov. 26, 2001

(51) Int. Cl.$^7$ .......................... B60K 41/04; F02D 9/06
(52) U.S. Cl. .................. 477/32; 60/602; 123/323; 188/273
(58) Field of Search ............. 477/32, 33, 100; 60/602, 600, 605.1; 123/323; 188/273

(56) References Cited

U.S. PATENT DOCUMENTS

| | | | | |
|---|---|---|---|---|
| 4,300,869 A | * | 11/1981 | Swearingen | 415/160 |
| 5,813,231 A | * | 9/1998 | Faletti et al. | 60/602 |
| 6,020,652 A | | 2/2000 | Daudel et al. | 290/45 |
| 6,062,025 A | * | 5/2000 | Okada et al. | 60/602 |
| 6,067,798 A | * | 5/2000 | Okada et al. | 60/602 |
| 6,152,853 A | * | 11/2000 | Banks, III | 477/186 |
| 6,220,031 B1 | * | 4/2001 | Daudel et al. | 60/602 |
| 6,256,991 B1 | * | 7/2001 | Schmidt et al. | 60/602 |
| 6,349,253 B1 | * | 2/2002 | Bellinger | 477/32 |
| 6,418,719 B2 | | 7/2002 | Terry et al. | 60/602 |
| 6,497,097 B2 | * | 12/2002 | Schmidt et al. | 60/602 |
| 6,543,226 B1 | * | 4/2003 | Bischoff et al. | 60/602 |

* cited by examiner

Primary Examiner—Ankur Parekh
(74) Attorney, Agent, or Firm—Fulbright & Jaworski L.L.P.

(57) ABSTRACT

An engine brake control system for a vehicle drive train including an internal combustion engine with an exhaust system and a turbocharger includes a variable inlet turbine in the exhaust system as part of the turbocharger which has a nozzle inlet control, a turbine wheel inlet and variable inlet nozzle vanes in the turbine wheel inlet of the variable inlet turbine and coupled with the nozzle inlet control. Further, a controller controls the variable inlet nozzle vanes through a number of positions from fully open to fully closed. Inputs to the controller affecting its operation include a speed sensor, a drive coupling sensor, a gear selection sensor, an overdrive gear sensor, an engine speed sensor, a throttle sensor, a pressure sensor and a warm-up sensor. A user interface both receives and sends information from and to the controller. The engine brake control system not only includes modulation of the engine brake, but also provides for control of a torque converter, automatic transmission and overdrive. With throttled engines, the throttle valve can be opened and the fuel supply disabled. Modulation of the variable inlet nozzle vanes is responsive to speed and acceleration. Control over the remaining engine and drive train components is used to enhance the utility of the engine brake.

28 Claims, 10 Drawing Sheets

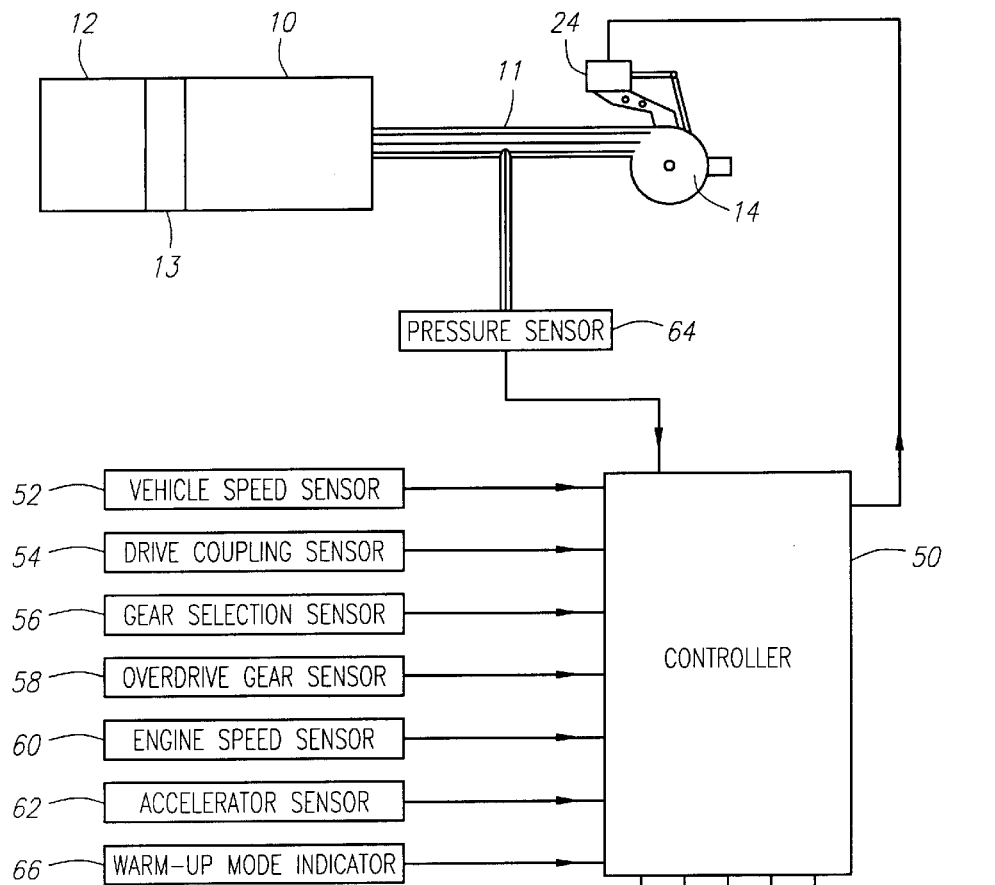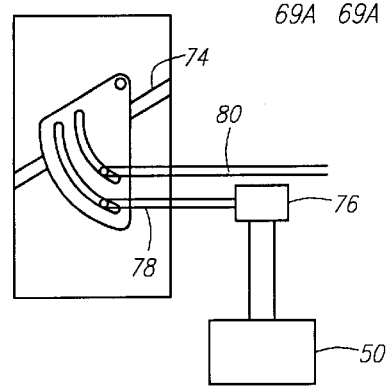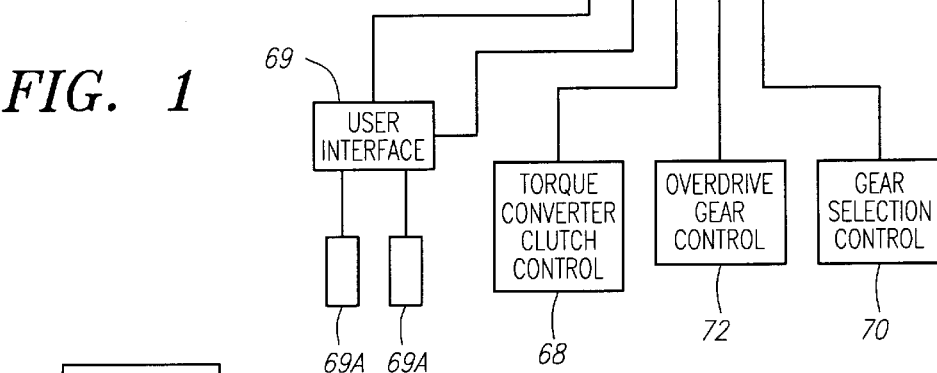
FIG. 1
FIG. 4

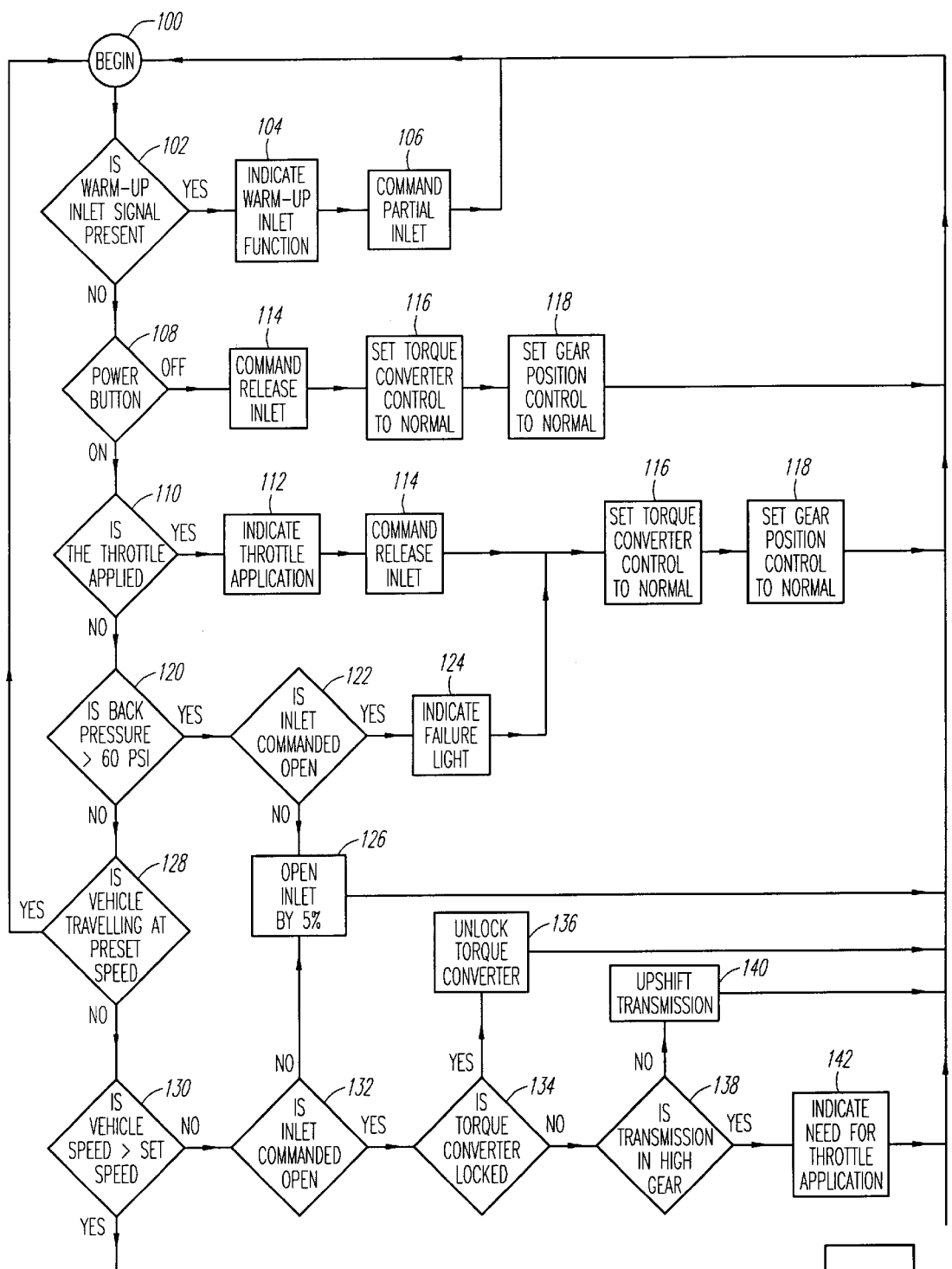
FIG. 5A
FIG. 5

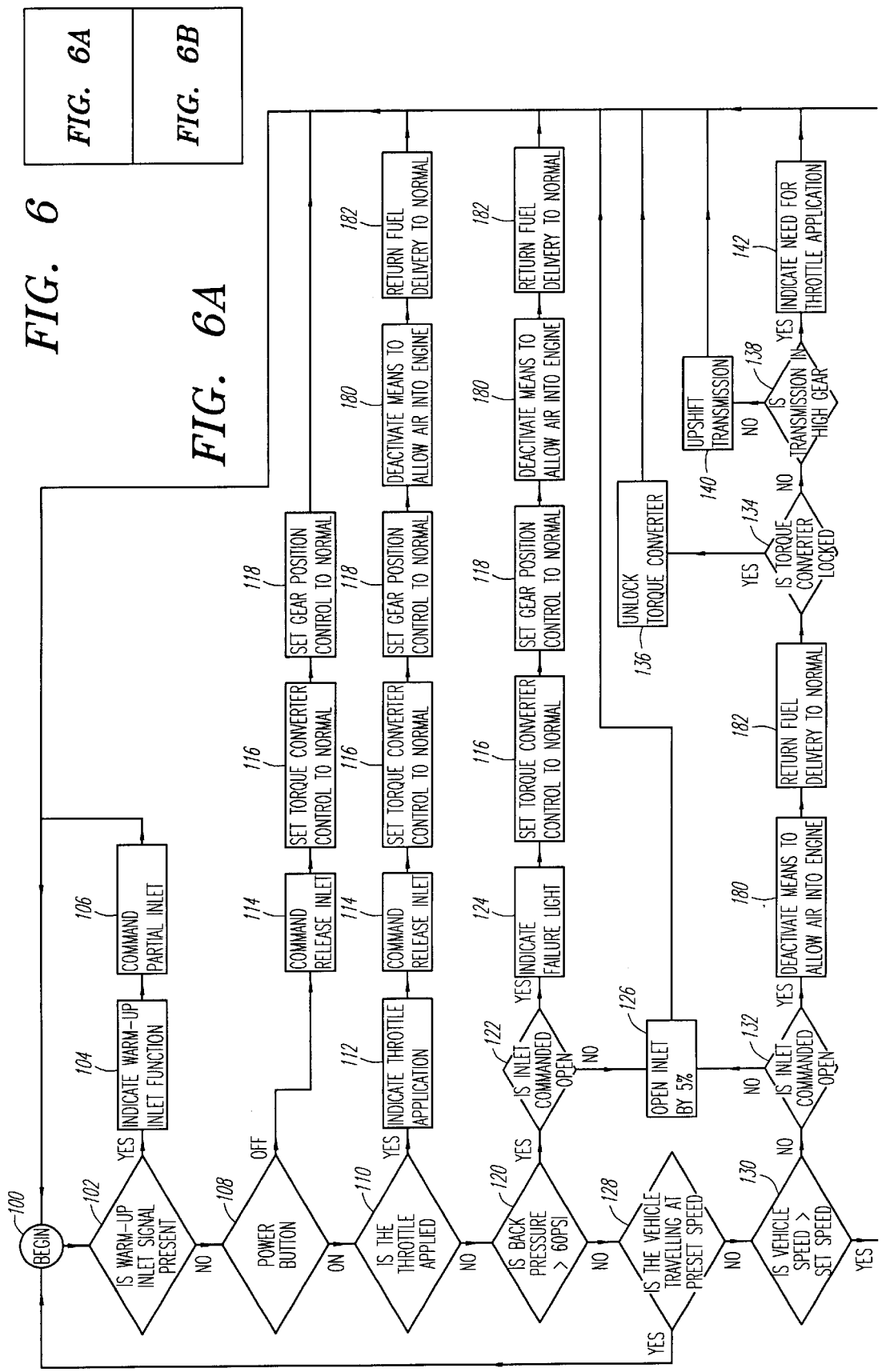

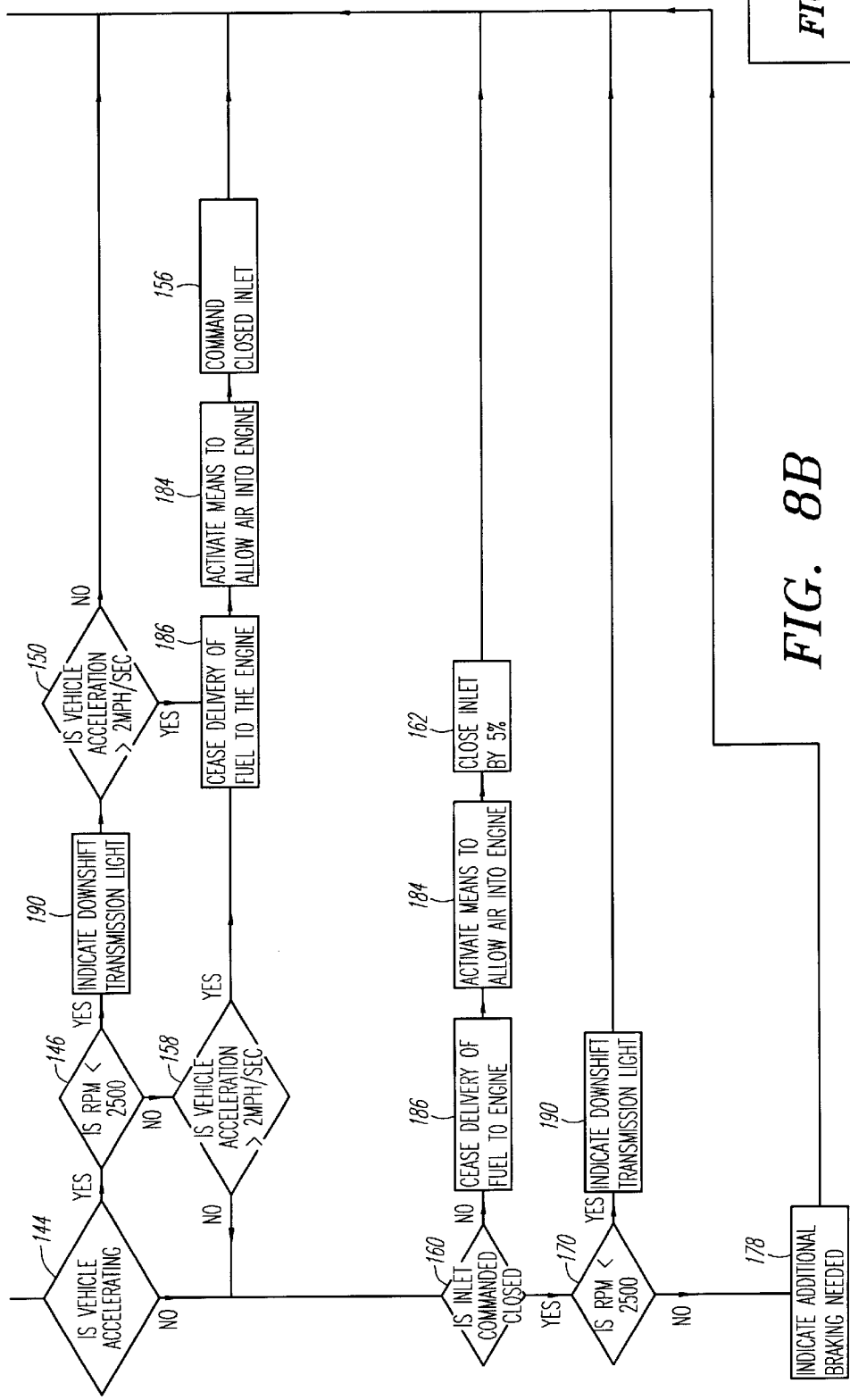

VEHICLE ENGINE BRAKE AND CONTROL SYSTEM

BACKGROUND OF THE INVENTION

The field of the present invention is vehicle engine brakes and the control thereof.

Engine brakes are typically valves operatively positioned in exhaust systems of internal combustion engines for greatly impeding the flow of exhaust gases from the engine. Such devices are commonly employed on diesel engines which are not throttled. They may be used on throttled gasoline engines as well. In principle, the engine brake resists exhaust flow from the engine under conditions when the engine is running by power derived from the wheels through the drive train rather than by internal combustion. Under such circumstances, the engine operates as a piston pump, drawing air through the intake and forcing it through the exhaust. By restricting exhaust flow, greater pressures are experienced within the engine cylinders to create retarding or braking power.

Such engine brakes are located within the exhaust train downstream of the engine exhaust manifold. Butterfly valves with restricted holes therethrough or measured clearance about the periphery are pivotally mounted within the exhaust train. Most commonly, the vehicle operator has access to a switch within the vehicle cab to either activate or deactivate the valve. The valve is often controlled by one of a hydraulic cylinder, a pneumatic vacuum cylinder and an electric actuator. Links typically convert linear actuation to valve rotation. Recent such brakes offer the operator a choice of valve positions controlled through a selector within the cab.

Engine brakes are understood to be most prevalent on diesel engines. Such brakes are less effective on gasoline engines because such engines are throttled. With engine power off, modern gasoline internal combustion engines can include electronic control for disabling the fuel injection system. In addition, the throttle valve or valves within the engine intake are closed when power is not applied. Vacuum is generated in the intake with the engine in this mode. With the throttle valve on the engine intake closed, the ability of the valve in an engine brake to develop pressure within the engine is severely compromised. Consequently, with the fuel off and the engine brake on, it has been found advantageous to open the throttle valve or valves in order that the engine brake can be fully enabled.

As the engine brake is designed to substantially increase pressure within the exhaust manifold and, in turn, the engine itself when the power is off, such brakes typically are deactivated with application of the accelerator pedal. With initiation of internal combustion, significantly more exhaust flow is created which, without the automatic shutoff, would result in damaging overpressure and heat.

With the need to disable the exhaust valve upon application of power to the engine and with the limited control capability on the valves of such engine brakes, a desired speed range is often difficult to maintain unless the downgrade is sufficiently steep that both the engine brake and the wheel brakes are needed to prevent acceleration. In such a circumstance, the wheel brakes modulate the braking to maintain a desired speed. The more current engine brake designs have multiple settings selected by the operator from the cab. The multiple settings offer finite additional control. Even so, the settings are not responsive to vehicle conditions.

SUMMARY OF THE INVENTION

The present invention is directed to an engine braking system including both apparatus and method. The invention contemplates modulation of vanes in the turbine wheel inlet of a variable inlet turbine on a turbocharger system responsive to engine conditions.

In a first separate aspect of the present invention, an engine brake for a vehicle drive system includes a vehicle speed sensor, variable inlet nozzle vanes in the turbine wheel inlet of the variable inlet turbine and a controller defining an inlet open position, an inlet closed position and intermediate positions therebetween. The position of the controller is determined by conditions of the vehicle drive system including a speed signal from the vehicle speed sensor. Through such a system, target conditions can be presented which the controller operates to approach. Consequently, the overall braking system is more flexible in achieving selected speeds.

In a second separate aspect of the present invention, an engine brake for a vehicle drive system includes a vehicle speed sensor, variable inlet nozzle vanes and a controller defining an inlet open position, an inlet closed position and intermediate positions therebetween. The position of the controller is determined by conditions of the vehicle drive system including the vehicle speed and the magnitude of acceleration. Through such a system, response to target conditions which the controller operates to approach can vary depending upon need. Consequently, the overall braking system is more flexible and responsive in achieving selected speeds.

In a third separate aspect of the present invention, the features of the first or second separate aspects further include an internal combustion engine with an exhaust system as part of a drive system. In the case of a gasoline internal combustion engine with an intake throttle valve, the controller further includes a throttle valve disabling signal to the throttle valve. For diesel engines, such a disabling signal is unnecessary.

In a fourth separate aspect of the present invention, an engine brake for a vehicle drive system which includes an internal combustion engine, an exhaust system and an automatic transmission includes a vehicle speed sensor, variable inlet nozzle vanes and a controller in communication with the speed sensor and coupled with the variable inlet nozzle vanes. The controller modulates the inlet based upon parameters of the vehicle such as vehicle speed, vehicle acceleration and exhaust manifold back pressure. The controller includes output shift signals in communication with the automatic transmission. The controller is able to employ both higher and lower gearing to assist in engine braking control. Control can additionally be extended by locking and unlocking a torque converter.

In a fifth separate aspect of the present invention, an engine brake for a vehicle drive system includes a exhaust manifold pressure sensor, variable inlet nozzle vanes and a controller defining an inlet open position, an inlet fully shut position and intermediate positions therebetween. The position of the controller is determined by conditions of the exhaust manifold pressure. Through such a system, increased braking efficiency can be achieved at low engine speeds.

In a sixth separate aspect of the present invention, a method of braking contemplates the selection of a vehicle speed value, a sensing of the vehicle speed and a comparison between the two. Variable inlet nozzle vanes are modulated responsive to the difference between the vehicle speed value and the vehicle speed.

In a seventh separate aspect of the present invention, the features of the sixth separate aspect further include the calculation of the rate of change of the vehicle speed. More or less aggressive changes in any of the inlet modulation, transmission gear selection and torque converter engagement can be employed based on the rate of change of the vehicle speed.

In an eighth separate aspect of the present invention, a method of braking contemplates the sensing of the exhaust manifold pressure. Exhaust flow is modulated responsive to the exhaust manifold pressure by controlling variable inlet nozzle vanes. Greater braking efficiency is achieved at low engine speeds.

In a ninth separate aspect of the present invention, combinations of any of the foregoing aspects are contemplated.

Accordingly, it is an object of the present invention to provide improved engine brake systems offering greater flexibility and control. Other and further objects and advantages will appear hereinafter.

BRIEF DESCRIPTION OF THE DRAWINGS

FIG. 1 is a schematic view of a variable inlet turbine and control system.

FIG. 4 is a mechanical schematic of an intake throttle valve.

DETAILED DESCRIPTION OF THE PREFERRED EMBODIMENTS

Figure 2:
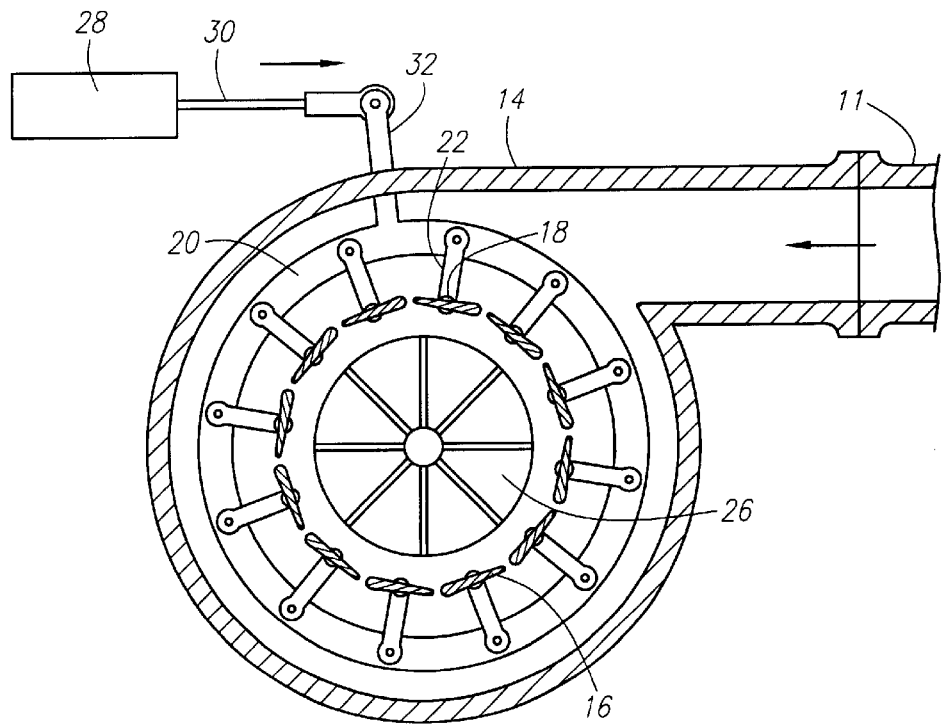
FIG. 2 is a cross-sectional schematic of a variable inlet turbine with the variable inlet vanes illustrated in the closed position.

An engine brake for a vehicle in the form of a variable inlet turbine as part of a turbocharger system is shown schematically in FIG. 1. An internal combustion engine 10 includes an exhaust system 11. The engine 10 is part of a vehicle drive system which may include an automatic transmission 12 and torque converter 13. Alternatively, the vehicle drive system may include a manual transmission 12 and a clutch 13. Further, the engine 10 may either be a diesel or a gasoline engine. The exhaust system 11 for modern vehicle internal combustion engines typically includes a manifold extending from each engine exhaust port. A collector receives the exhaust flow from the manifold for discharge through an exhaust pipe. An engine brake is typically located in the exhaust system 11 downstream of the manifold and collector. Reference is made to U.S. Pat. No. 6,152,853, the disclosure of which is incorporated herein by reference. The portion of the exhaust system 11 between the engine 10 and the engine brake is to be of sufficient integrity so that elevated exhaust pressures can be sustained without leakage and damage.

Figure 3:
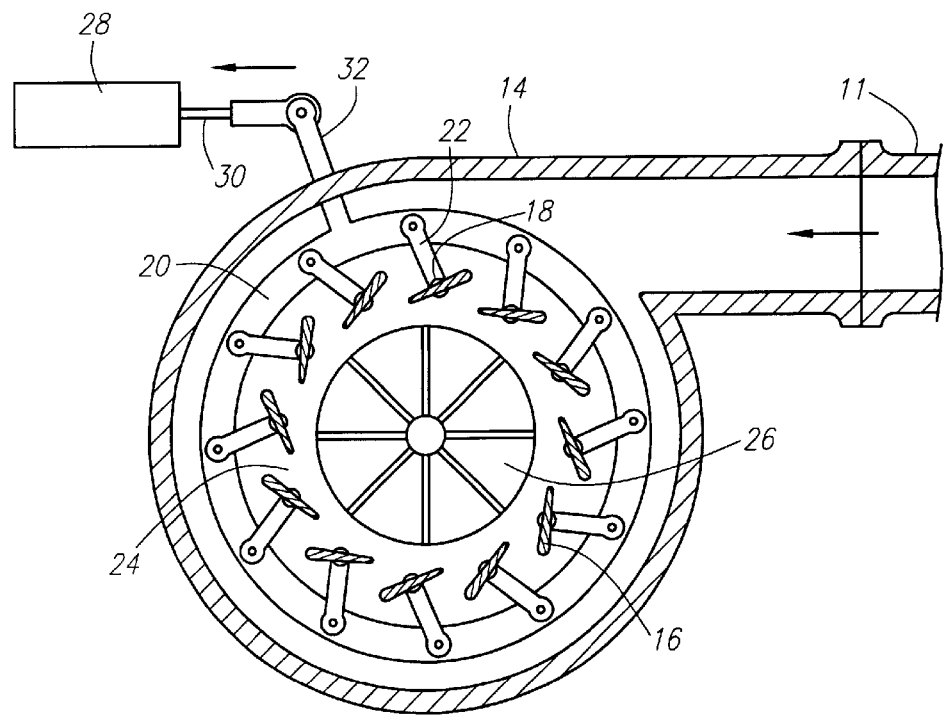
FIG. 3 is a cross-sectional schematic of a variable inlet turbine with the variable inlet vanes illustrated in the open position.

The engine brake is a variable inlet turbine 14 in the exhaust system 11. The turbine 14 includes variable inlet nozzle vanes 16 which are pivotally mounted to the turbine 14 about axes 18. A rotatable annular actuator 20 is coupled to each vane 16 by a link 22, respectively. Rotation of the annular actuator 20 about the axis of the turbine rotates the vanes 16 as can be seen by a comparison between FIG. 2 with the vanes 16 closed and FIG. 3 with the vanes open. Having the vanes 16 closed means that they approach one another to close the nozzles therebetween. When the vanes 16 pivot away from one another, the spacing creates a turbine wheel inlet 24 defining nozzles between the vanes 16 for flow from about the circumference radially into a turbine wheel 26. A turbine wheel nozzle inlet control 28 is coupled by an actuator rod 30 with a crank 32 on the rotatable annular actuator 20 to control the modulation of the variable inlet nozzle vanes 16. Various such controls are disclosed as actuators 24 in U.S. Pat. No. 6,152,853.

A number of inputs and outputs are associated with a controller 50 to sense and control a number of conditions of the vehicle drive system. A first input to the controller 50 is that of a speed sensor 52. A speed signal representative of the vehicle speed is now typically provided by the vehicle to the main controller of the vehicle. The actual sensor may be located at any number of positions. It is intended that the vehicle speed sensor 52 be employed to provide the speed signal representative of the speed of the vehicle to the controller 50. The controller 50 or, if available, the main controller of the vehicle can provide a differentiator to generate an acceleration signal as well. The acceleration signal is most conveniently calculated as the time differential of the speed signal.

The states of the engine and drive train are also provided as input signals to the controller 50. The state of a torque converter 13 is provided by a drive coupling sensor 54 feeding a signal indicative of lock or unlock to the controller 50. A gear selection sensor 56 also provides a signal to the controller 50. The gear selection sensor 56 may be employed for either manual or automatic transmissions 12 to indicate gear position. An overdrive gear sensor 58 may also be provided where appropriate.

The operation of the engine 10 is also presented to the controller 50. An engine speed signal is typically supplied by the conventional vehicle components to the central vehicle controller. This signal from such an engine speed sensor 60 is also provided to the controller 50. An accelerator sensor 62 provides an input to signal when the accelerator pedal is applied. Pressure in the exhaust manifold is sensed by a pressure sensor 64. This device provides an indicator of whether the manifold pressure is above or below a maximum desirable manifold pressure. Such a pressure is selected to be around 60 psi in the preferred embodiment. Other engine conditions such as the state of a warm-up mode 66 may be provided to the controller. The warm-up mode is a feature provided by engine manufacturers on diesel engines where the exhaust is restricted to accelerate engine warm-up. The engine brake inlet vanes 16 are contemplated to replace the separate warm-up valve now provided on engines with this feature.

Controlling outputs from the controller 50 provide maximum braking capability and control. The controller may provide locking and unlocking signals to the torque converter 68. Similarly, the controller 50 can provide shift commands to an automatic transmission control 70 and, where applicable, an overdrive control 72. The controller 50 also provides a modulated input to the actuator 24 of the engine brake 14.

Finally, a user interface is both in input and output communication with the controller 50. The user interface 69 provides for the input of a vehicle speed value. The user interface 69 also provides an ON/OFF control with a power button.

Typically engine brakes include some bypass passage method to limit the pressure which can be built up in the manifold. Holes through a valve or a gap between the periphery of a valve and the wall of the exhaust system are known to provide that restricted passage bypass function even with the valve "closed". Separate bypass passages are also known. These prior systems which cannot provide a fully closed position lack adequate performance at low engine speed as the bypass passage is able to accommodate a greater percentage of the total flow under low engine speed operation. Other engine brake systems that have valves that can completely close utilize a separate bypass valve to control excess back pressure. This type of system requires an additional valve, passage and control actuator to relieve exhaust manifold pressure, however, effectively controls back pressure only in a portion of the entire rpm range of an engine.

In the preferred embodiment, there is no bypass passage. In this regard, the functions of a primary valve and a separate relief type valve are combined into modulated vanes in the turbine wheel inlet of the variable inlet turbine. This eliminates the complexity of any bypass valve, passage and actuator. The operation of the engine brake 14 involves the actuation of the variable inlet nozzle vanes 16. The variable inlet nozzle vanes 16 are arranged to move from a fully open position with the variable inlet nozzle vanes 16 rotated to be separated from one another to a fully closed position with the vanes 16 rotated into contact with one another to fully close off exhaust flow. The control 50, using exhaust manifold back pressure, modulates the inlet vanes 16 to avoid overpressure and also accommodate a wide range of engine speeds. Intermediate positions between the fully open position and the fully closed position are also provided to gain greater control over the retarding force of the engine brake 14. To distinguish between conditions where the inlet is closed but includes the possibility of fixed bypass and where the inlet is fully shut off without possibility of bypass, the term "closed" will be used here to denote the former and the term "fully shut" will be used here to denote the latter.

Figure 5B:
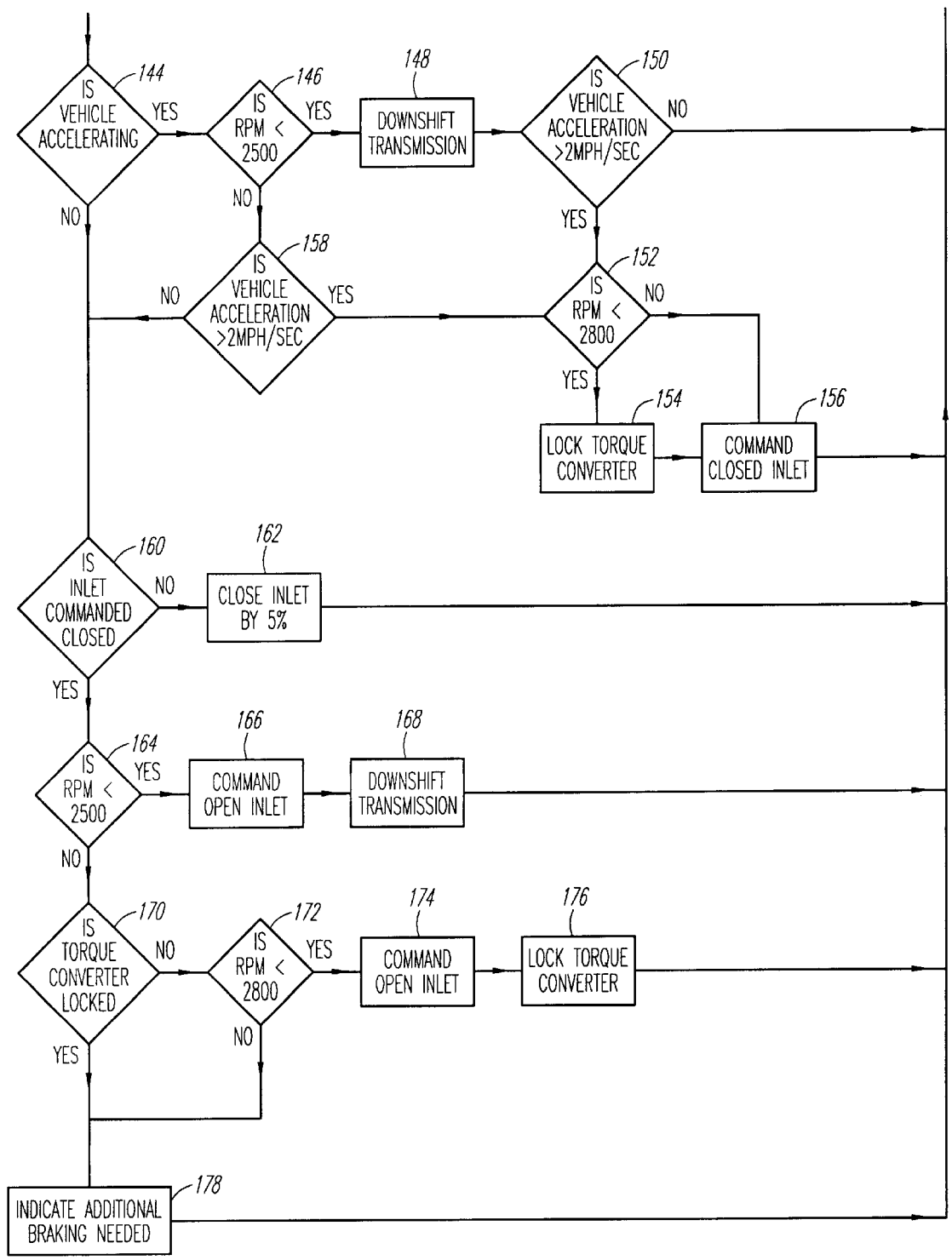
FIG. 5 is a logic flow chart for an engine brake control for a vehicle with an automatic transmission and no intake throttle valve.

Turning to the operation of the system, the logic flow charts of FIGS. 5 through 8 separately represent the several combinations of automatic or manual transmissions and gasoline or diesel engines. FIG. 5 is directed to an engine brake control system for use with a vehicle having an automatic transmission and a diesel engine. The sequence begins at the initial position 100. A first query checks 102 the state of the warm-up signal 66 from the main vehicle controller. The signal derived from the main vehicle controller indicating activation of the warm-up mode is recognized 104 and the actuator 24 is commanded 106 to assume a partially closed position. The activation of the actuator 24 for the warm-up mode is independent of whether the engine brake system has been activated by the operator.

If the warm-up signal is not presented to the controller 50, the state of the power button is next sampled 108. When OFF, a command 114 is given to release the operation to the turbocharger control to set the variable inlet nozzle vanes in respond to engine conditions. The torque converter 13 is set 116 to normal and the transmission 12 is also set 118 to normal vehicle control. In this way all conditions are returned to the initial position 100. When the power button of the user interface 69 is ON, the engine brake controls are activated under certain circumstances. The engine brake system is not to be employed when the accelerator has been applied. The accelerator sensor 62 is sensed 110 for its state of application. If the accelerator is applied, this is recognized 112 and a command 114 is given to fully open the variable inlet nozzle vanes 16. The torque converter 13 is set 116 to normal vehicle control. The transmission 12 is also set 118 to normal vehicle control. This may also include an appropriate setting for an overdrive gear as well.

If no accelerator is applied, the state of pressure within the exhaust system 11 between the internal combustion engine 10 and the engine brake 14 samples the pressure sensor 64 to determine 120 back pressure. If the pressure exceeds the preselected maximum amount, 60 psi in this case, the controller 50 is queried 122 to determine if the variable inlet nozzle vanes 16 have been commanded open. If so and if the back pressure is above the acceptable level, an indication is given 124 to the operator by means of a failure light. Further, given the apparent failure mode, the torque converter 13 is set 116 to normal and the transmission 12 is set 118 to normal as well and the cycle returns to initial position 100. If the variable inlet nozzle vanes 16 are not open under the condition of excessive pressure, then a failure is not indicated and the engine brake 14 is commanded 126 to open by an incremental amount. Five percent is used in this embodiment.

Where the back pressure within the exhaust system 11 does not exceed the maximum pressure, the speed signal representative of the speed of the vehicle from the speed sensor 52 is sampled 128. If the vehicle is traveling at the preset speed set at the user interface 69, the cycle is complete and returns to the initial position 100.

When the speed differs from that of the vehicle speed value entered through the user interface 69, the vehicle speed sensor 52 is compared 130 to determine if the vehicle is traveling faster than or slower than the vehicle speed value input from the user interface 69. If the vehicle is not traveling faster than the preset speed value, the state of the variable inlet nozzle vanes 16 is sensed 132. If the variable inlet nozzle vanes 16 are not already commanded to be open, the variable inlet nozzle vanes 16 are opened 126 by a preset increment of five percent. The system then cycles back to the initial position 100 to initiate a new routine. If instead the variable inlet nozzle vanes 16 are already commanded to be open, the drive coupling sensor 54 is sampled 134 to determine the condition of the torque converter 13. If the torque converter 13 is locked and the vehicle speed is less than the preset speed value, the torque converter 13 is unlocked 136 and the routine recycles to the initial position 100. If the torque converter 13 is not locked, the gear selection sensor 56 is checked 138. If the transmission 12 is not in high gear, the transmission 12 is commanded 138 to upshift 140 and the routine returns to the initial position 100. If the transmission 12 is already in high gear and the speed is below the set value and the torque converter 13 is unlocked, a signal indicating a need for the application of the accelerator is given 142 to the operator. The routine then recycles back to the initial position 100. Thus, under the circumstance that the vehicle is operating at below the preset speed value, the engine brake 14, the torque converter 13 and the transmission 12 are put in states of providing less retarding of the vehicle. Where an overdrive is also included, this too may be engaged under the right engine speed conditions to provide a less retarding state.

If the vehicle speed is greater than the preset speed value, the rate of speed change of the vehicle is determined 144. With the vehicle accelerating, greater measures are taken to retard the vehicle than when the vehicle is not accelerating or is decelerating. When the vehicle is accelerating, the state of the engine is sensed by looking to the engine speed sensor 60 to determine if the engine speed is slow enough that a downshift may be initiated. In the preferred embodiment, this engine speed is less than 2500 rpm. Naturally, each engine and transmission assembly would dictate its own engine speed threshold. When the engine speed is low enough, a downshift is commanded 148 of the transmission 12. The magnitude of the acceleration is then determined 150. In this embodiment, the threshold magnitude of acceleration is set at 2 miles per hour per second. If the acceleration is below this threshold level, the routine returns to the initial position 100. If the acceleration is greater than the threshold level, the speed of the engine is determined by sampling the engine speed sensor 60 and comparing 152 the engine speed with a preset high speed value. In this embodiment, the preset high speed value is 2800 rpm. If the engine speed is below the high speed value, the torque converter 13 is locked 154. Once the torque converter 13 is locked 154, the variable inlet nozzle vanes 16 are commanded 156 to close. If the speed of the engine 10 is above the high speed value, the variable inlet nozzle vanes 16 are commanded 156 to be closed regardless of the state of the torque converter 13 and the routine returns to the initial position 100. The command 156 to close the variable inlet nozzle vanes 16 with the preferred embodiment engine brake will fully shut off exhaust flow. Modulation based on the state of the pressure sensor 64 will prevent overpressure by opening the inlet, steps 120, 122 and 126.

With the sampling 146 of the speed of the engine 10, if the speed is above a minimum threshold, 2500 rpm in this instance, the acceleration is compared 158 with the threshold for excessive acceleration. Again, two mph/second is employed in this embodiment. If the acceleration is too rapid, the speed of the engine is again sensed and compared 152 with the upper value of the speed range. As described above, there is a determination to either command 156 the closure of the variable inlet nozzle vanes 16 or first lock 154 the torque converter and then command 156 the closure of the variable inlet nozzle vanes 16.

Where the vehicle acceleration is not above the upper threshold value, and the engine speed is above the value allowing a downshift, or if the vehicle is not accelerating, the engine brake 14 is checked 160 to see if the variable inlet nozzle vanes 16 are fully closed. If not, the actuator 24 is commanded 162 to close the variable inlet nozzle vanes 16 by an increment to increase the engine brake application. In this embodiment, the increment has been established as five percent. If the engine brake 14 is already fully applied, the drive train is next turned to for increasing the braking effect of the engine.

The speed of the engine is again sensed and compared 164 with the established standard for safe downshifting. In this example, the standard is 2500 rpm. If the speed is sufficiently low, the variable inlet nozzle vanes 16 are opened 166 and the transmission is commanded 168 to downshift. The routine then cycles to the initial position 100. If the engine speed is too high for downshifting, the status of the drive coupling sensor 54 is sensed 170. If the torque converter 13 is not locked, the speed of the engine is again sensed 172. If the speed is no greater than the upper limit for locking the torque converter 13, 2800 rpm in this example, the variable inlet nozzle vanes 16 are opened 174 and the torque converter 13 is locked 176. The routine then recycles to the initial position 100. With the exception of the possible disengagement of an overdrive as a further retarding step, all has been done with the engine brake control system and further braking must be provided by additional means. Consequently, if the torque converter 13 is locked or the engine speed is too high to lock the torque converter 13, an indicator is energized 178 to indicate to the operator that additional braking is required. The system then recycles to the initial position 100.

Figure 6B:
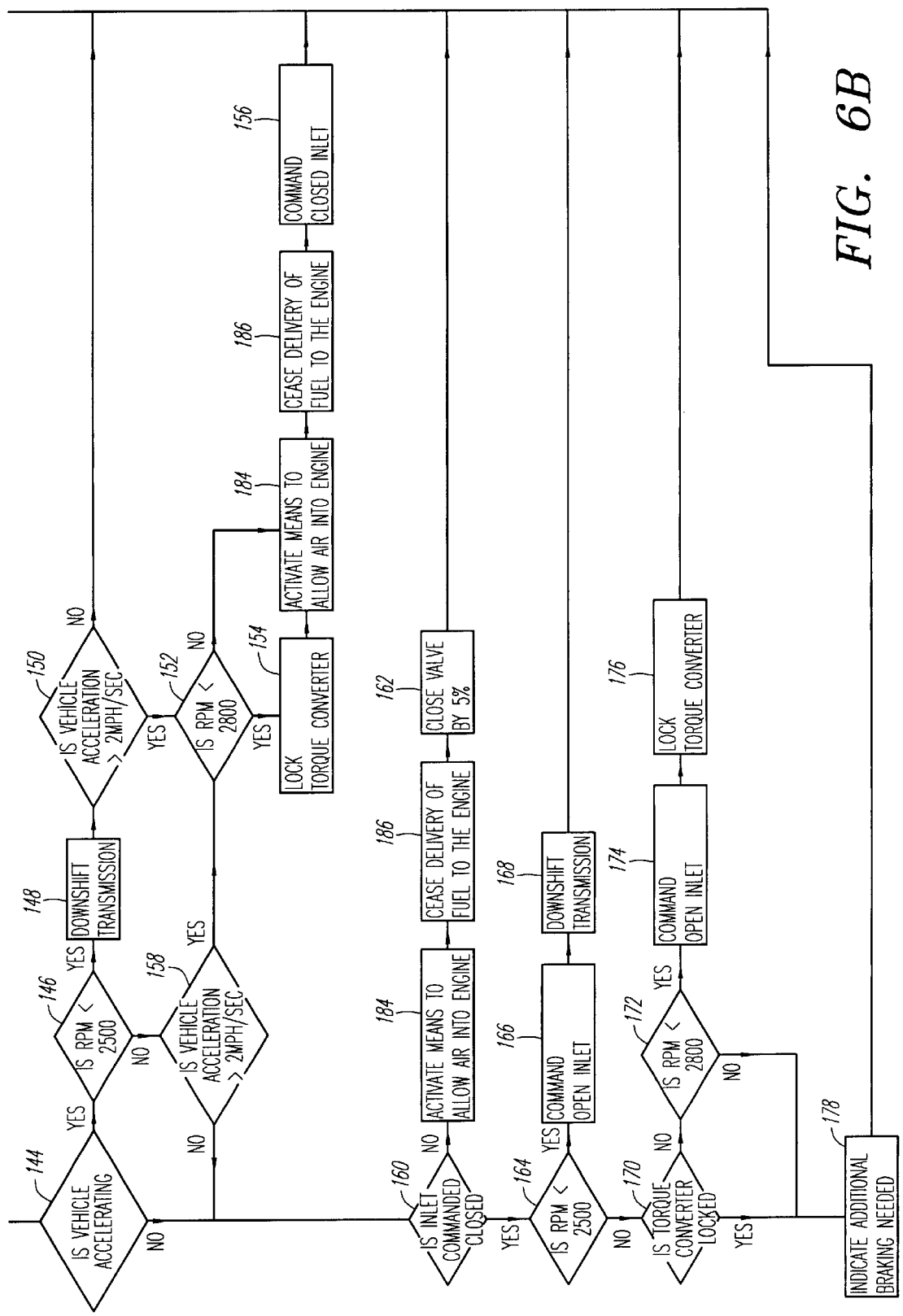
FIG. 6 is a logic flow chart for an engine brake control for a vehicle with an automatic transmission and an intake throttle valve.

Looking next to FIGS. 4 and 6, the system is presented for a gasoline engine. Rather than repeat all of the steps, the differences associated with a throttled engine will be specifically described. The applicable reference numbers from the prior description will be incorporated here where the steps are employed to the same effect. The use of an engine brake 14 in association with a gasoline engine requires the manipulation of the throttled intake air to the engine. If not opened with application of the engine brake 14, the throttle creates intake vacuum which works at cross purposes to the closure of the engine brake variable inlet nozzle vanes 16. One reduces pressure in the engine and the other increases pressure in the engine. Consequently, when the engine brake variable inlet nozzle vanes 16 are to be closed, an intake throttle valve 74 is opened to allow full charging with incoming air. With the fuel shut off and the engine above idle, opening of the intake throttle inlet 74 does not increase power. The controller 50 controls an intake valve actuator 76 which actuates a link 78 to open the valve independently of the accelerator linkage 80. The controller 50 also provides a signal to the fuel system to terminate fuel delivery upon activation of the engine brake 14. The actual intake throttle valve 74 may be the normal valve used to control the engine. However, it may also be a separate valve associated with the intake manifold to bypass the valve controlled by the accelerator pedal.

When there is an indication that the throttle has been applied 110, the actuator 76 holding the intake throttle valve 74 open is deactivated 180 and fuel delivery is returned 182 to normal. This series of steps to disable all of the engine brake controls returns the vehicle to a power running condition. Even if the throttle is not applied but the back pressure in the manifold has exceeded the maximum limit, the deactivation of the engine brake system and the inlet control is once again performed as with the applied throttle.

Similarly, when the vehicle speed is less than the preset speed value and the variable inlet nozzle vanes 16 are open, the activator 76 for opening the throttle valve 74 is released 180 and the fuel delivery is returned 182 to normal.

Turning then to the conditions where the engine brake 14 is enhanced, under the conditions of rapid vehicle acceleration the activator 76 is activated 184 to hold the throttle valve 74 open for air flow into the engine and fuel delivery is cut off 186. When the vehicle is not accelerating but the speed of the vehicle is above the preset vehicle speed value, and the variable inlet nozzle vanes 16 are closed, the activator 76 opens 184 the throttle valve 74 and fuel is cut off 186. In these circumstances, the closure or partial closure of the variable inlet nozzle vanes 16 are enhanced in operation because the throttle valve 74 to the engine is opened.

Figures 7, 7A, 7B:
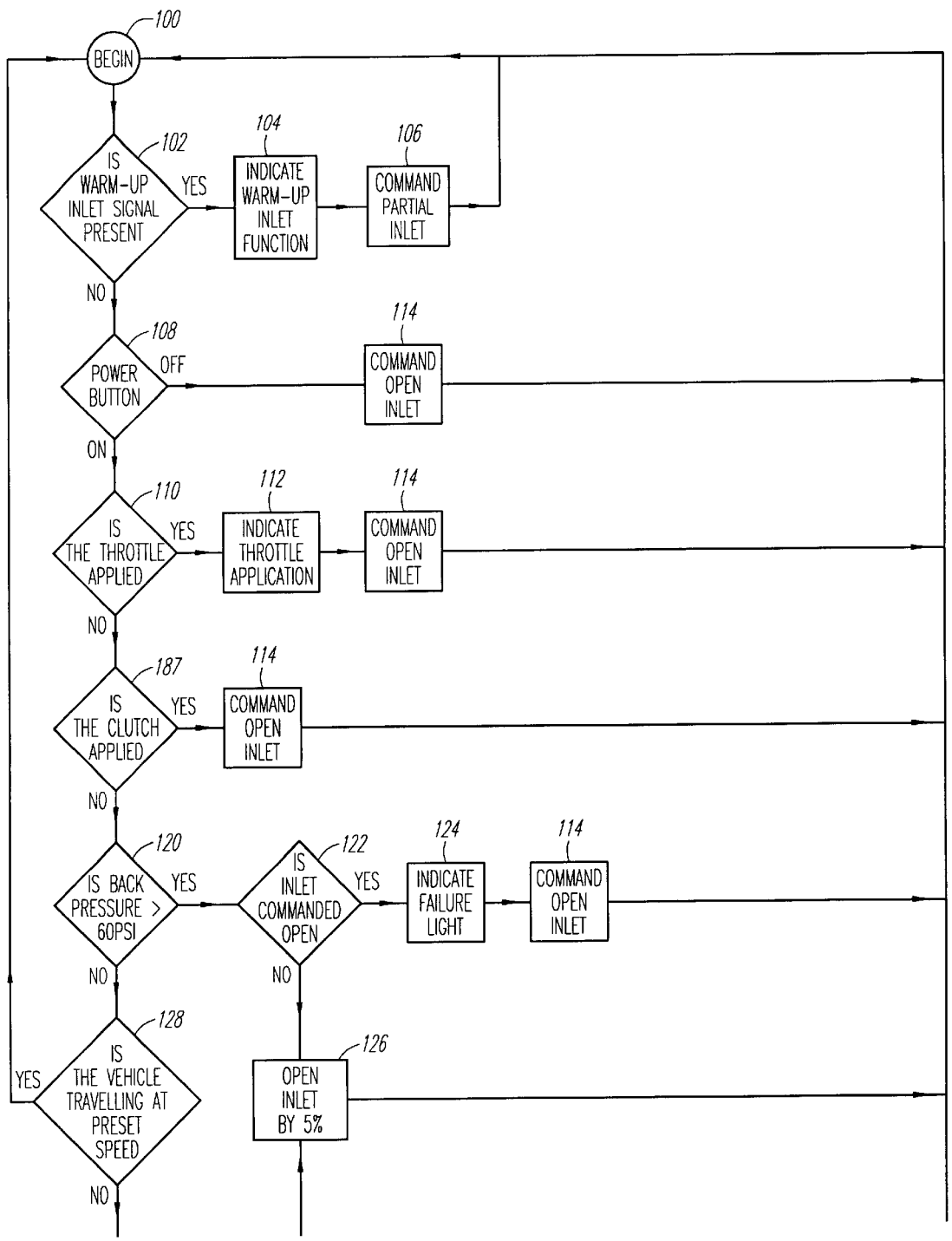
FIG. 7 is a logic flow chart for an engine brake control for a vehicle with a manual transmission and no intake throttle valve.
Figure 7B:
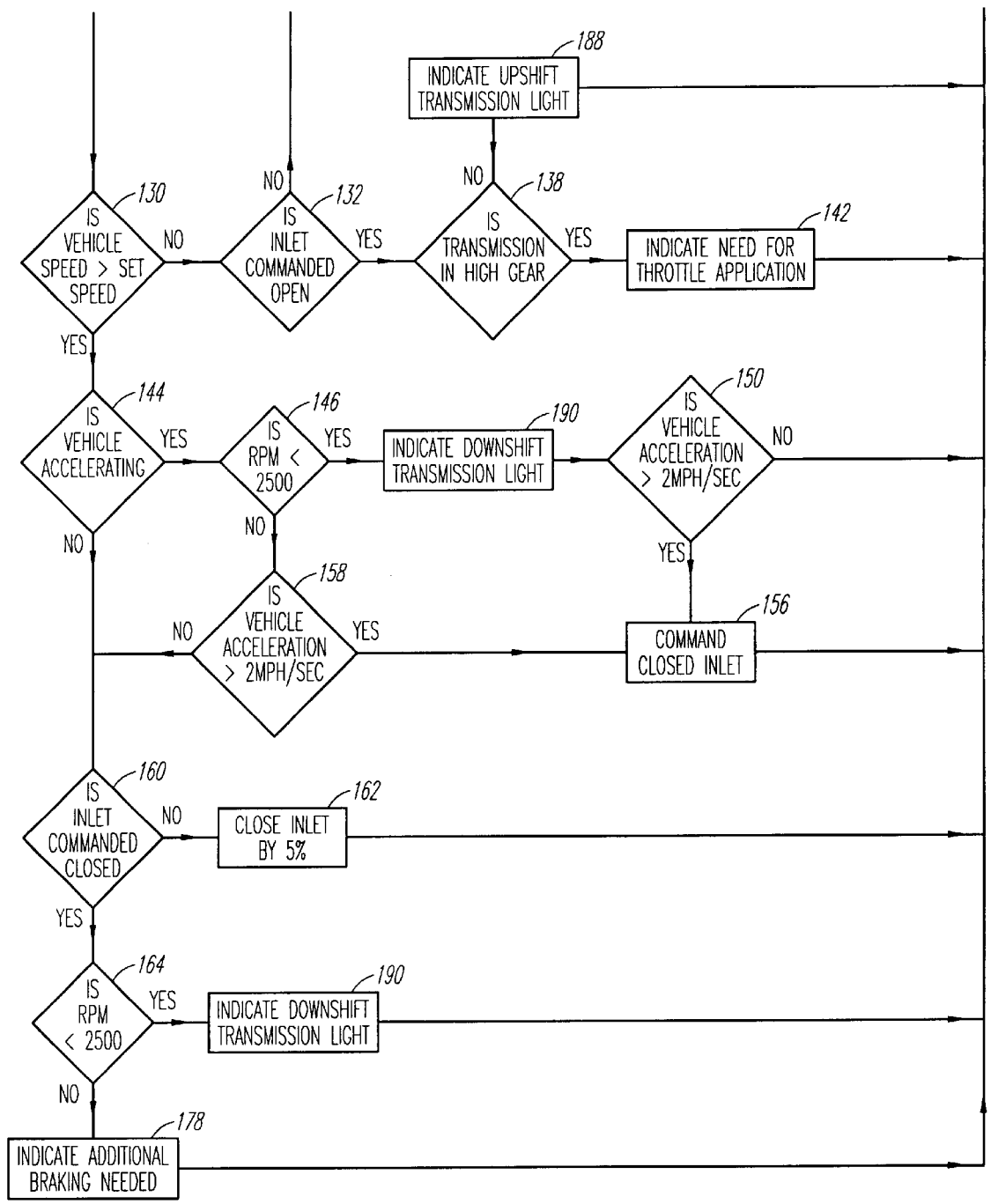

FIG. 7 sets forth the schematic for an engine brake control system for a diesel type engine employing a manual transmission 12. The reference numbers may be compared with those of FIGS. 5 and 6 where the steps are to the same effect. Because the drive train includes a manual transmission 12, no mechanism is provided for automatically actuating the drive coupling 13 or the transmission 12. Consequently, the system can only provide signals to the operator for upshifting and downshifting. As the clutch 13 is under operator control, a test 187 senses for an applied clutch, and if so the inlet is opened 114. Consequently, the several steps found in the embodiment of FIG. 5 to lock or unlock the drive coupling 13 are eliminated as are transmission shifts. Instead, when the vehicle speed is less than the preset speed value, and the engine brake 14 is disabled, the system will indicate 188 the need to upshift the transmission 12 if the transmission 12 is not yet in high gear. A light may be employed on the user interface 69 to convey that information to the operator. When the vehicle speed is greater than the preset vehicle speed value and the vehicle is accelerating, a downshift is indicated 190 if the engine is in a speed range low enough to accept the downshift. Similarly, if the vehicle is traveling at a greater rate of speed than the preset vehicle speed value but the vehicle is not accelerating and the variable inlet nozzle vanes 16 are closed, a downshift is indicated 190 by the user interface 69 when the speed of the engine is low enough to accommodate such a downshift.

Figure 8A:
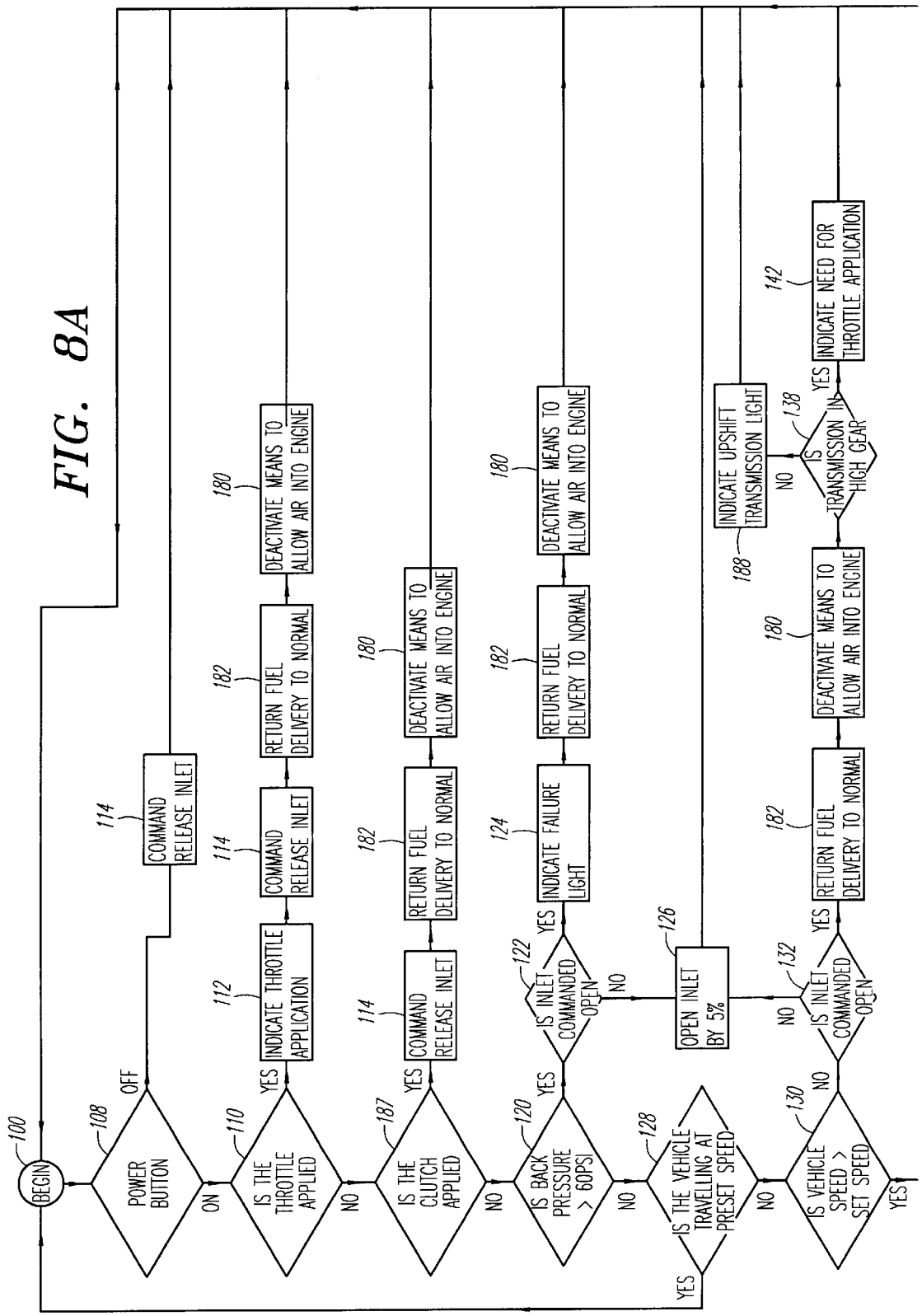
FIG. 8 is a logic flow chart for an engine brake control for a vehicle with a manual transmission and an intake throttle valve.

Looking lastly to FIG. 8 which illustrates an engine brake control system for a gasoline-type engine having an intake throttle operating with a manual transmission, again the reference numerals reflect the same steps presented in the prior figures. In effect, the steps of activating or deactivating the inlet valve to the engine 184 and 180 and the initiation of fuel delivery 182 and the ceasing of fuel delivery 186 are employed at similar locations to that of FIG. 6. As presented in FIG. 8, the device of FIG. 8 eliminates control of the drive coupling and of the transmission. Instead, indicator lights for upshifting 188 and downshifting 190 are employed.

Thus, controls are provided for the maximum employment of an engine brake to a plurality of engine types and drive train configurations. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An engine brake for a vehicle drive system having an internal combustion engine with an exhaust system and a transmission, comprising
   a vehicle speed sensor including a speed signal representative of the speed of the vehicle;
   a transmission gear position sensor including a gear position signal;
   a variable inlet turbine in the exhaust system including a nozzle inlet control, a turbine wheel inlet and a variable inlet nozzle in the turbine wheel inlet of the variable inlet turbine and coupled with the nozzle inlet control;
   a controller in communication with the speed sensor to receive the speed signal and the transmission gear position sensor to receive the gear position signal and coupled with the nozzle inlet control, the controller modulating the nozzle inlet control from a fully open position to a fully closed position and outputting shift commands to the transmission responsive to conditions of the vehicle drive system including the vehicle speed signal, the vehicle drive system further having a torque converter, the transmission being automatic, the controller outputting locking and unlocking signals to the torque converter.

2. An engine brake for a vehicle drive system having an internal combustion engine with an exhaust system and a transmission, comprising
   a vehicle speed sensor including a speed signal representative of the speed of the vehicle;
   a transmission gear position sensor including a rear position signal;
   a variable inlet turbine in the exhaust system including a nozzle inlet control, a turbine wheel inlet and a variable inlet nozzle in the turbine wheel inlet of the variable inlet turbine and coupled with the nozzle inlet control;
   a controller in communication with the speed sensor to receive the speed signal and the transmission gear position sensor to receive the gear position signal and coupled with the nozzle inlet control, the controller modulating the nozzle inlet control from a fully open position to a fully closed position and outputting shift commands to the transmission responsive to conditions of the vehicle drive system including the vehicle speed signal, the internal combustion engine having an intake throttle valve, the controller further outputting throttle valve opening signals to the intake throttle valve.

3. The engine brake of claim 1, the variable inlet nozzle having pivotally mounted vanes with variable nozzles therebetween.

4. The engine brake of claim 2, the variable inlet nozzle having pivotally mounted vanes with variable nozzles therebetween.

5. An engine brake for a vehicle drive system having an internal combustion engine with an exhaust system and a torque converter, comprising
   a vehicle speed sensor including a speed signal representative of the speed of the vehicle;
   a variable inlet turbine in the exhaust system including a nozzle inlet control, a turbine wheel inlet and variable inlet nozzle vanes in the turbine wheel inlet of the variable inlet turbine and coupled with the nozzle inlet control;
   a controller in communication with the speed sensor to receive the speed signal and coupled with the nozzle inlet control, the controller modulating the nozzle inlet control from a fully open position to a fully closed position and outputting locking and unlocking signals to the torque converter responsive to conditions of the vehicle drive system including the vehicle speed signal.

6. The engine brake of claim 5, the internal combustion engine further including an intake throttle valve, the controller further including a throttle valve opening signal to the intake throttle valve.

7. The engine brake of claim 5 further comprising
   a user interface with an ON/OFF switch and a vehicle speed selector in communication with the controller.

8. An engine braking method for a vehicle drive system having an internal combustion engine with an exhaust system and a variable inlet turbine in the exhaust system having a variable inlet nozzle, comprising
   selecting a vehicle speed value;
   sensing vehicle speed;
   comparing the vehicle speed value and the vehicle speed;
   calculating the rate of change of the vehicle speed from the sensing vehicle speed;
   modulating the variable inlet nozzle of the variable inlet turbine responsive to the difference between the vehicle speed value and the vehicle speed and to the rate of change of the vehicle speed to regulate back pressure to effect engine braking by the back pressure.

9. An engine braking method for a vehicle drive system having an internal combustion engine with an exhaust system and a variable inlet turbine in the exhaust system having a variable inlet nozzle, comprising selecting a vehicle speed value;
sensing vehicle speed;
comparing the vehicle speed value and the vehicle speed;
calculating the rate of change of the vehicle speed from the sensing vehicle speed;
modulating the variable inlet nozzle of the variable inlet turbine responsive to the difference between the vehicle speed value and the vehicle speed and to the rate of change of the vehicle speed;
sensing engine speed;
locking and unlocking a torque converter responsive to the difference between the vehicle speed value and the vehicle speed, to the rate of change of the vehicle speed and to the engine speed.

10. The engine braking method of claim 9 further comprising
sensing the gear position of an automatic transmission;
upshifting and downshifting the automatic transmission responsive to the difference between the vehicle speed value and the vehicle speed, to the rate of change of the vehicle speed, to the engine speed, to the state of the torque converter and to the gear position of the automatic transmission.

11. An engine braking method for a vehicle drive system having an internal combustion engine with an exhaust system and a variable inlet turbine in the exhaust system having a variable inlet nozzle comprising selecting a vehicle speed value;
sensing vehicle speed;
comparing the vehicle speed value and the vehicle speed;
calculating the rate of change of the vehicle speed from the sensing vehicle speed;
modulating the variable inlet nozzle of the variable inlet turbine responsive to the difference between the vehicle speed value and the vehicle speed and to the rate of chance of the vehicle speed;
sensing engine speed;
sensing gear position of a transmission;
indicating upshift commands and downshift commands responsive to engine speed, to the gear position of the transmission, to the difference between the vehicle speed value and the vehicle speed and to the rate of change of the vehicle speed.

12. An engine braking method for a vehicle drive system having an internal combustion engine with an exhaust system and a variable inlet turbine in the exhaust system having a variable inlet nozzle, comprising selecting a vehicle speed value;
sensing vehicle speed;
comparing the vehicle speed value and the vehicle speed;
calculating the rate of change of the vehicle speed from the sensing vehicle speed:
modulating the variable inlet nozzle of the variable inlet turbine responsive to the difference between the vehicle speed value and the vehicle speed and to the rate of chance of the vehicle speed;
shutting off fuel to the engine upon modulating the variable inlet nozzle vanes of the variable inlet turbine;
opening a throttle valve to the engine upon modulating the variable inlet nozzle of the variable inlet turbine.

13. An engine braking method for a vehicle drive system having an internal combustion engine with an exhaust system and a variable inlet turbine in the exhaust system having a variable inlet nozzle, comprising selecting a vehicle speed value;
sensing vehicle speed;
comparing the vehicle speed value and the vehicle speed;
calculating the rate of chance of the vehicle speed from the sensing vehicle speed;
modulating the variable inlet nozzle of the variable inlet turbine responsive to the difference between the vehicle speed value and the vehicle speed and to the rate of chance of the vehicle speed;
applying more engine braking force with the vehicle speed value less than the vehicle speed including selecting among modulating the variable inlet nozzle of the variable inlet turbine by incrementally closing the variable inlet nozzle downshifting an automatic transmission and locking a torque converter with the vehicle speed value less than the vehicle speed.

14. The engine braking method of claim 13 further comprising
abating engine braking force with the vehicle speed value greater than the vehicle speed including selecting among the variable inlet nozzle of the variable inlet turbine by incrementally opening the variable inlet nozzle, upshifting an automatic transmission and unlocking a torque converter with the vehicle speed value greater than the vehicle speed.

15. The engine braking method of claim 13 further comprising
fully closing the variable inlet nozzle with vehicle acceleration above a preselected value.

16. An engine braking method for a vehicle drive system having an internal combustion engine with an exhaust system and a variable inlet turbine in the exhaust system having a variable inlet nozzle, comprising selecting a vehicle speed value;
sensing vehicle speed;
comparing the vehicle speed value and the vehicle speed;
modulating the variable inlet nozzle of the variable inlet turbine flow responsive to the difference between the vehicle speed value and the vehicle speed;
calculating the rate of change of the vehicle speed from the sensing vehicle speed;
modulating the variable inlet nozzle responsive to the rate of change of the vehicle speed;
applying more engine braking force with the vehicle speed value less than the vehicle speed including selecting among modulating exhaust flow by incrementally closing the variable inlet nozzle, downshifting an automatic transmission and locking a torque converter with the vehicle speed value less than the vehicle speed;
abating engine braking force with the vehicle speed value greater than the vehicle speed including selecting among modulating exhaust flow by incrementally opening the variable inlet nozzle, upshifting an automatic transmission and unlocking a torque converter with the vehicle speed value greater than the vehicle speed.

17. The engine braking method of claim 16 further comprising sensing engine speed;

locking and unlocking a torque converter responsive to the difference between the vehicle speed value and the vehicle speed, to the rate of change of the vehicle speed and to the engine speed.

18. The engine braking method of claim 17 further comprising sensing the gear position of an automatic transmission;

upshifting and downshifting the automatic transmission responsive to the difference between the vehicle speed value and the vehicle speed, to the rate of change of the vehicle speed, to the engine speed, to the state of the torque converter and to the gear position of the automatic transmission.

19. The engine braking method of claim 16 further comprising sensing engine speed;

sensing gear position of a transmission;

indicating upshift commands and downshift commands responsive to engine speed, to the gear position of the transmission, to the difference between the vehicle speed value and the vehicle speed and to the rate of change of the vehicle speed.

20. The engine braking method of claim 16 further comprising shutting off fuel to the engine upon modulating the exhaust flow;

opening a throttle valve to the engine upon modulating the exhaust flow.

21. The engine braking method of claim 16 further comprising modulating exhaust flow including fully closing the variable inlet nozzle vanes with vehicle acceleration above a preselected value.

22. An engine brake for a vehicle drive system having an internal combustion engine with an exhaust system, comprising a vehicle speed sensor including a speed signal representative of the speed of the vehicle;

a variable inlet turbine in the exhaust system including a nozzle inlet control, a turbine wheel inlet and a variable inlet nozzle in the turbine wheel inlet of the variable inlet turbine and coupled with the nozzle inlet control;

a controller in communication with the speed sensor to receive the speed signal and coupled with the nozzle inlet control, the controller modulating the nozzle inlet control from a fully open position to a fully closed position responsive to the vehicle speed signal to regulate back pressure to effect engine braking by the back pressure.

23. The engine brake of claim 22 with the vehicle drive system further having a transmission, further comprising a transmission gear position sensor including a gear position signal, the controller being in communication with the transmission gear position sensor to receive the gear position signal, the controller further outputting shift commands to the transmission responsive to conditions of the vehicle drive system including the vehicle speed signal.

24. The engine brake of claim 23 with the vehicle drive system further having a torque converter and the transmission being automatic, the controller further outputting locking and unlocking signals to the torque converter responsive to conditions of the vehicle drive system including the vehicle speed signal.

25. The engine brake of claim 22 with the internal combustion engine having an intake throttle valve, the controller further outputting throttle valve opening signals to the intake throttle valve responsive to conditions of the vehicle drive system including the vehicle speed signal.

26. The engine brake of claim 22 further comprising a user interface with an ON/OFF switch activating and deactivating the engine brake and a vehicle speed selector in communication with the controller.

27. The engine brake of claim 22 further comprising an engine speed sensor in communication with the controller.

28. The engine brake of claim 22, the variable inlet nozzle having pivotally mounted vanes with variable nozzles therebetween.

* * * * *

UNITED STATES PATENT AND TRADEMARK OFFICE
CERTIFICATE OF CORRECTION

PATENT NO.     : 6,652,414 B1
DATED          : November 25, 2003
INVENTOR(S)    : Banks, III It is certified that error appears in the above-identified patent and that said Letters Patent is hereby corrected as shown below:

<u>Column 10,</u>
Line 6, delete "rear" and insert -- gear -- therefor.

<u>Column 11,</u>
Line 65, delete "vanes".

<u>Column 12,</u>
Line 20, after "nozzle" insert -- , --.

Signed and Sealed this

Twentieth Day of January, 2004

JON W. DUDAS
*Acting Director of the United States Patent and Trademark Office*